(12) United States Patent
Leese et al.

(10) Patent No.: US 9,598,306 B2
(45) Date of Patent: Mar. 21, 2017

(54) PELLET AND A METHOD OF MANUFACTURING GLASS

(71) Applicant: Sibelco UK Ltd., Sandbach, Cheshire (GB)

(72) Inventors: Samuel Mark Leese, Sandbach (GB); Peter Robert Sheppardson, Sandbach (GB)

(73) Assignee: Sibelco UK Ltd., Sandbach, Cheshire (GB)

( * ) Notice: Subject to any disclaimer, the term of this patent is extended or adjusted under 35 U.S.C. 154(b) by 0 days.

(21) Appl. No.: 14/956,000

(22) Filed: Dec. 1, 2015

(65) Prior Publication Data

US 2016/0083287 A1 Mar. 24, 2016

Related U.S. Application Data

(63) Continuation of application No. 14/395,180, filed as application No. PCT/GB2013/050923 on Apr. 10, 2013, now Pat. No. 9,206,071.

(30) Foreign Application Priority Data

Apr. 18, 2012 (GB) .................................. 1206791.4

(51) Int. Cl.
| | |
|---|---|
| C03B 1/02 | (2006.01) |
| C03C 3/076 | (2006.01) |
| C03C 3/078 | (2006.01) |
| C03C 1/02 | (2006.01) |
| C03B 3/00 | (2006.01) |

(52) U.S. Cl.
CPC .............. *C03C 3/078* (2013.01); *C03B 1/02* (2013.01); *C03B 3/00* (2013.01); *C03C 1/026* (2013.01); *C03C 3/076* (2013.01)

(58) Field of Classification Search
CPC C03C 1/02; C03C 1/026; C03C 3/076; C03C 3/078; C03B 1/02; C03B 3/00; C03B 3/02; C09C 1/02; C09C 1/021; C09C 1/022; C09C 1/024
See application file for complete search history.

(56) References Cited

U.S. PATENT DOCUMENTS

| | | | |
|---|---|---|---|
| 2,229,406 A | 1/1941 | Lyle | |
| 3,924,030 A | 12/1975 | Tatara et al. | |
| 3,956,446 A | 5/1976 | Eirich et al. | |
| 4,293,324 A | 10/1981 | Saeman | |
| 4,354,864 A | 10/1982 | Saeman | |
| 4,418,153 A | 11/1983 | Saeman | |
| 9,206,071 B2 * | 12/2015 | Leese | ...................... C03C 1/026 |
| 2005/0022557 A1 | 2/2005 | Carty | |
| 2008/0087044 A1 | 4/2008 | Carty | |
| 2008/0312061 A1 | 12/2008 | Collart et al. | |
| 2014/0024518 A1 | 1/2014 | Leese et al. | |
| 2014/0274652 A1 * | 9/2014 | Mastek | ................... C03C 1/026 |
| | | | 501/31 |

FOREIGN PATENT DOCUMENTS

| | | |
|---|---|---|
| EP | 0618177 | 3/1994 |
| EP | 2208713 | 7/2010 |
| GB | 1172318 | 11/1969 |
| GB | 1331673 | 9/1973 |
| JP | 55100225 | 7/1980 |
| JP | 57145035 | 9/1982 |
| WO | 03074434 | 9/2003 |
| WO | 2009001586 | 12/2008 |
| WO | 2010139739 | 12/2010 |

OTHER PUBLICATIONS

International Search Report and Written Opinion dated Sep. 6, 2012 for corresponding application PCT/GB2012/050141 (15 pages).
International Preliminary Report on Patentability in International Application No. PCT/GB2012/050141, issued Jul. 30, 2013, 8 pages.
International Search Report and Written Opinion in International Application No. PCT/GB2013/050923, mailed Jul. 8, 2013, 9 pages.
International Preliminary Report on Patentability in International Application No. PCT/GB2013/050923, issued Oct. 21, 2014, 6 pages.
'DigitalFire Ceramic Materials Database,' [online]. "Sodium Metasilicate Eutectic," 2008, retrieved on Jan. 27, 2014. Retrieved from the Internet: URL: http://digitalfire.com/4sight/material/sodium_metasilicate_eutectic_2473.html, 2 pages.

* cited by examiner

*Primary Examiner* — Elizabeth A Bolden
(74) *Attorney, Agent, or Firm* — Fish & Richardson P.C.

(57) ABSTRACT

The present invention relates to pellets for use in the manufacture of glass.

9 Claims, 11 Drawing Sheets

Table 7 - Example glass compositions (amounts in % w/w)

| | Low Iron Float/Container | Float | Bulbs/Table | Potash/Lead | Oven/Lab |
|---|---|---|---|---|---|
| $SiO_2$ | 70-73.5 | 70-73 | 70.0-72.5 | 55-56 | 80.0-81.0 |
| $Al_2O_3$ | 0.4-2.2 | 0.5-1.5 | 0.3-2.6 | 0-0.2 | 2.2-3.1 |
| $TiO_2$ | | | | | |
| $Fe_2O_3$ | <0.03 | <0.1 | <0.03 | <0.02 | <0.05 |
| CaO | 7.8-10.8 | 8-11 | 5.4-6.5 | 0.0-0.2 | 0.0-0.2 |
| MgO | 0.1-4.0 | 1-4 | 3-4.5 | | |
| $K_2O$ | 0.4-1.0 | 0.3-0.8 | 0.3-1.2 | 11-12 | 0.0-0.3 |
| $Na_2O$ | 12.5-15.5 | 13-15 | 15.8-17 | 0.0-0.2 | 3.9-4.5 |
| PbO | | | | 31-33 | |
| | | | | | |
| $B_2O_3$ | | | | | 12.0-13.0 |
| $SO_3$ | 0.2 | 0.25-0.3 | | | |
| $F_2$ | | | | | |
| FeO | | | | | |

FIG. 10

Table 8 - Example glass fibre compositions (amounts in % w/w)

| | Insulation | Insulation | Electrical | Chemical Resistant | Strength | Advantex | Borated E | Duran (test tubes) |
|---|---|---|---|---|---|---|---|---|
| | T1* | T2* | E | C* | S | E | E | |
| SiO$_2$ | 63 | 588.6 | 52-56 | 64-68 | 64 | 61 | 56 | 81 |
| Al$_2$O$_3$ | 5 | 3.2 | 12-16 | 3.5 | 25 | 13 | 14 | 2 |
| TiO$_2$ | | | 0-1.5 | 0-1 | | 0.2 | 0.2 | |
| Fe$_2$O$_3$ | | | | 0.8 | | 0.3 | | |
| CaO | 14 | 8 | 16-25 | 11-15 | | 22.4 | 22.2 | |
| MgO | 3 | 4.2 | 0-6 | 2-4 | 10 | 3 | | |
| K$_2$O | 10 | 15.1 | 0.0-2.0 | 7-10 | | 0.1 | | 2 |
| Na$_2$O | | | | | | 0.8 | 0.7 | 2 |
| PbO | | | | | | | | |
| B$_2$O$_3$ | 5 | 10.1 | 5-10 | 4.6 | | 0 | 6.5 | 13 |
| SO$_3$ | | | | | | | | |
| F$_2$ | | | 0-1 | | | | | |
| FeO | | | 0.8 | | | | | |

Key: T1 & T2 = insulating; E = electrical; C = chemical resistance; S = strength.

FIG. 11

PELLET AND A METHOD OF MANUFACTURING GLASS

CROSS REFERENCE TO RELATED APPLICATIONS

This application is a continuation of U.S. application Ser. No. 14/395,180, filed Oct. 17, 2014, which was filed pursuant to 35 U.S.C. §371(c) from PCT Application No. PCT/GB2013/050923, filed Apr. 10, 2013, which claims priority to UK Application No. 1206791.4 filed on Apr. 18, 2012. The entire contents of the above applications are incorporated herein by reference.

DESCRIPTION OF INVENTION

The present invention relates to a pellet. In particular, the present invention relates to a pellet for use in a glass batch process. The present invention also relates to a process for the production of such a pellet, as well as a method for making glass.

Glass is an amorphous, non-crystalline, solid material. Glasses are typically brittle and often optically transparent. A glass is defined as an inorganic product of fusion which has been cooled through its glass transition to the solid state without crystallising. The main component of most glasses, in general use, is silica ($SiO_2$).

Pure silica has a relatively high thermodynamic melting point of 2000° C. and requires process temperatures of over 2300° C. Pure silica can be made into glass for special applications. However, it is common to add substances to common glass to simplify processing. One component added to silica in a glass is sodium carbonate ($Na_2CO_3$) which lowers the required process temperature to about 1500° C. However, soda (sodium oxide ($Na_2O$), which decomposes from sodium carbonate in a glass melt) makes glass water soluble, which is usually undesirable, so lime (calcium oxide, CaO) is often added, to provide a better chemical durability. Some magnesium oxide (MgO) and/or aluminium oxide ($Al_2O_3$) is/are sometimes added, also to provide a better chemical durability. Many glasses have other ingredients added to change their properties, depending on their intended function.

Common glass is generally produced in a two step process, and then shaped to make it suitable for a variety of applications.

The first step is batch mixing. The mixture of ingredients to make up the glass (typically, silica, sodium carbonate, calcium carbonate and recycled glass, together with small quantities of various other trace ingredients) are mixed, to ensure an even mix of ingredients, and fed into the furnace.

In the second step, the mixture is heated to around 1500° C., where the ingredients melt, various chemical reactions take place and $CO_2$ and $SO_2$ are evolved. These chemical reactions form molten glass (or, 'glass solution') which can be moulded and cooled.

The most common furnace used for manufacturing glass solution is a continuous regenerative type, with either the side or the end ports connecting brick checkers to the inside of the melter. Checkers conserve fuel by acting as heat exchangers; the fuel combustion products heat incoming combustion air. The molten glass is fined (bubbles are removed) and refined (heat conditioning) and is then pressed, blown, drawn, rolled or floated, depending on the final product.

British patent number GB 1331673 relates to a process for making glass batches in pelletized form. GB 1331673 discusses the disadvantages associated with loose glass batches, i.e. loose mixtures of the ingredients which are combined in a glass solution. Loose glass batches are used in many glass manufacturing processes. Loose glass batches give a strong tendency to dust during weighing, mixing and charging. This endangers the health of those who are involved with batch preparation and glass melting.

The use of a loose batch also suffers from the disadvantage of heat being lost from the top of the melter during the batch melting process. In this regard, batch melting requires the use of a lot of energy, given the temperatures involved. Loss of heat is a disadvantage because glass manufacturers are striving to minimise their use of energy, i.e. to be more efficient, thus minimising their environmental impact and saving on costs. The use of a loose batch also suffers from the disadvantage of long dwell times during the batch melting process resulting in a poor efficiency of heat exploitation.

GB 1331673 discusses the idea of pelletizing glass batches. The formation of granular aggregations or pellets during the pelletization takes place by imparting a rotary movement to the batch during simultaneous injection of a finer divided liquid, e.g. water or a solution of binder and water. These pellets are more easily transported than loose batches and are less damaging to health because they do not give off dust.

During the glass manufacturing procedure, the melting of the various constituents of the solid components of the glass is necessary. Previous pelletized batches and/or loose batches used in the glass manufacturing process have been homogenous mixtures of the components required in the glass.

U.S. Pat. No. 4,418,153 discloses the use of layered glass batch pellets in a glass manufacturing process. These are said to be homogenous compositions from the interior of the pellet to the surface. The layered approach was used in U.S. Pat. No. 4,418,153 as a new way of forming glass batch pellets in a relatively efficient manner. The pellets produced in U.S. Pat. No. 4,418,153 are glass batch pellets for silicate glass compositions whose principal use if for flat glass, container glass, lighting wear, laboratory wear, light bulbs, and tumblers as well as in glass fibre installation. The layers in the pellets provide layers of the same composition.

To reiterate, the glass batch pellets produced in U.S. Pat. No. 4,418,153 have a homogenous cross-sectional composition from the interior to the surface.

A process for the production of layered glass batch pellets is also discussed in U.S. Pat. No. 4,354,864. This document describes a so-called "Lancaster mixer" which is used to prepare layered glass batch pellets.

PCT/US03/05962 discusses the reaction paths taken by raw material batch components when reacting with each other in a glass melt process. PCT/US03/05962 identifies problems with glass production in that segregation of components can occur, which reduces efficiency.

As mentioned in PCT/US03/05962, in the US glass industry alone, in excess of 250 trillion BTU is used annually to produce approximately 21 million tons of glass products; approximately 80% of this energy is supplied by natural gas. Melting one ton of glass should theoretically require only about 2.2 million BTU, but in reality it can range from 4.5 to 8.5 million BTU per ton due to losses and inefficiencies. Given this discussion, there is a need in the art for making glass manufacturing more efficient, so that less energy is required per unit of glass manufactured.

One way of mitigating this problem provided by PCT/US03/05962 is to selectively pre-combine certain components of a glass batch recipe, prior to introducing the overall batch composition into a furnace melting tank. These combinations of ingredients are created in a plurality of discreet reaction members formed while pelletizing different combinations of materials.

In a typical glass production process, using glass batches in pelletized form, or loose batches, the batches are introduced into the furnace and there is a heat gradient down the furnace. In another glass production process, there is a constant temperature down the furnace. The components are all mixed together in the furnace and there are various, complicated, reactions which ultimately lead to the production of glass.

The present inventors have examined the preparation of pellets for use in glass manufacture in a glass melt process.

According to a first aspect of the present invention, there is provided a pellet for use in a glass batch process, comprising:

a first layer comprising $Na_2CO_3$, and,
a second layer comprising $SiO_2$ and $CaCO_3$ enclosing the first layer,
wherein the first layer comprises 81% or more $Na_2CO_3$ by weight of the whole $Na_2CO_3$ content of the pellet.

Preferably, wherein the first layer comprises any one of 81%, 82%, 83%, 84%, 85%, 86%, 87%, 88%, 89%, 90%, 91%, 92%, 93%, 94%, 95%, 96%, 97%, 98%, 99% or more $Na_2CO_3$ by weight of the whole $Na_2CO_3$ content of the pellet.

Further preferable, wherein the first layer comprises any one of 99.1%, 99.2%, 99.3%, 99.4%, 99.5%, 99.6%, 99.7%, 99.8%, 99.9% or more $Na_2CO_3$ by weight of the whole $Na_2CO_3$ content of the pellet.

Advantageously, wherein the first layer comprises 100% $Na_2CO_3$ by weight of the whole $Na_2CO_3$ content of the pellet.

Preferably, wherein the pellet further comprises a third layer enclosed by the first layer.

Further preferably, wherein the pellet further comprises a third layer between the first layer and the second layer.

Advantageously, wherein the pellet further comprises a third layer enclosing the second layer.

Preferably, wherein the pellet further comprises a fourth, and optionally additional, layer or layers.

Further preferably, wherein the layers are continuous.

Advantageously, wherein the first layer comprises one or more decolourisers.

Preferably, wherein the one or more decolourisers comprise selenium, barium selenite and/or erbium oxide.

Further preferably, wherein: the first layer comprises $SiO_2$, $CaCO_3$ and $Na_2CO_3$; and, the second layer comprises $SiO_2$ and $CaCO_3$.

Advantageously, wherein the ratio by weight of the components of the first layer ranges as:

40-60 $SiO_2$
10-20 $CaCO_3$
20-50 $Na_2CO_3$.

Preferably, wherein the ratio by weight of the components of the first layer is 50.00 $SiO_2$: 14.44 $CaCO_3$: 35.58 $Na_2CO_3$.

Further preferably, wherein the ratio by weight of the components of the first layer is 53.77 $SiO_2$: 14.44 $CaCO_3$: 32.23 $Na_2CO_3$.

Advantageously, wherein the ratio by weight of the components of the second layer ranges as:

80-95 $SiO_2$
5-20 $CaCO_3$.

Preferably, wherein the ratio by weight of the components of the second layer is 89.57 $SiO_2$: 10.43 $CaCO_3$.

Further preferably, wherein the second layer consists essentially of a mixture of $SiO_2$ and $CaCO_3$.

Advantageously, wherein the first layer and the second layer, and any additional layers, are bound together by a binder.

Preferably, wherein the binder is water, an aqueous solution of sodium silicate, an aqueous solution of sodium carbonate, clay or cement.

Further preferably, wherein one or more of the layers comprises MgO and/or one or more alumina bearers.

Advantageously, wherein one or more of the layers comprises MgO, preferably wherein the MgO is included as dolomite.

Preferably, wherein one or more of the layers comprises one or more alumina bearers, optionally wherein the alumina bearers include feldspars and/or kaolin, and/or, wherein the one or more alumina bearers is only included in the outer layer of the pellet.

Further preferably, wherein the pellet comprises all of the ingredients for preparing a glass by a batch process.

In another aspect of the present invention, there is provided a method of making a pellet for use in a glass batch process; the pellet comprising a first layer comprising $Na_2CO_3$, and, a second layer comprising $SiO_2$ and $CaCO_3$ enclosing the first layer, the first layer comprising 81% or more $Na_2CO_3$ by weight of the whole $Na_2CO_3$ content of the pellet; the process comprising the steps of;

pelletising the components of the first layer comprising 81% or more $Na_2CO_3$ by weight of the whole $Na_2CO_3$ content of the pellet, and, pelletising the components of the second layer comprising $SiO_2$ and $CaCO_3$, and the pelletised first layer, so that the components of the second layer form a layer over the first layer.

Preferably, wherein the first layer comprises any one of 81%, 82%, 83%, 84%, 85%, 86%, 87%, 88%, 89%, 90%, 91%, 92%, 93%, 94%, 95%, 96%, 97%, 98%, 99% or more $Na_2CO_3$ by weight of the whole $Na_2CO_3$ content of the pellet.

Further preferably, wherein the first layer comprises any one of 99.1%, 99.2%, 99.3%, 99.4%, 99.5%, 99.6%, 99.7%, 99.8%, 99.9% or more $Na_2CO_3$ by weight of the whole $Na_2CO_3$ content of the pellet.

Advantageously, further comprising the step of:
pelletising a third layer either: enclosed by the first layer; between the first layer and the second layer; or, enclosing the second layer.

Preferably, further comprising the step of:
pelletising a fourth, and optionally additional, layer or layers.

Further preferably, further comprising the step of including trace ingredients of glass in the first layer.

Advantageously, further comprising the step of including one or more decolourisers in the first layer, preferably wherein the decolourisers are selenium, barium selenite and/or erbium oxide.

Preferably, wherein the step of pelletising the components of the first layer includes pelletising a mixture comprising $SiO_2$, $CaCO_3$ and $Na_2CO_3$.

Further preferably, wherein the step of pelletising the components of the second layer includes pelletising a mixture comprising $SiO_2$ and $CaCO_3$.

Advantageously, further comprising the step of binding the first layer and the second, and any additional layers, together with a binder, optionally, wherein the binder is water, an aqueous solution of sodium silicate, an aqueous solution of sodium carbonate, clay or cement.

In another aspect of the present invention, there is provided a method of making glass, comprising the steps of:

introducing one or more pellets comprising a first layer comprising $Na_2CO_3$, and, a second layer comprising $SiO_2$ and $CaCO_3$ enclosing the first layer, wherein the first layer comprises 81% or more $Na_2CO_3$ by weight of the whole $Na_2CO_3$ content of the pellet, into a glass melt furnace, heating the one or more pellets to produce a glass solution, and, cooling the glass solution to make a glass.

Preferably, wherein the first layer comprises any one of 81%, 82%, 83%, 84%, 85%, 86%, 87%, 88%, 89%, 90%, 91%, 92%, 93%, 94%, 95%, 96%, 97%, 98%, 99% or more $Na_2CO_3$ by weight of the whole $Na_2CO_3$ content of the pellet.

Further preferably, wherein the first layer comprises any one of 99.1%, 99.2%, 99.3%, 99.4%, 99.5%, 99.6%, 99.7%, 99.8%, 99.9% or more $Na_2CO_3$ by weight of the whole $Na_2CO_3$ content of the pellet.

In another aspect of the present invention, there is provided a method of making glass, comprising the steps of:

introducing one or more pellets according to any one of claims 1-24 into a reaction vessel, heating the one or more pellets to produce a glass solution, and, cooling the glass solution to make a glass.

Embodiments of the invention are described below with reference to the accompanying drawings, in which.

MANUFACTURING PROTOCOL FOR A LAYERED GLASS PELLET

Manufacturing one or more layered glass pellets according to the present invention requires a sequential batch process in which predetermined quantities of materials contained in a first layer are accurately weighted, having first corrected for any included moisture. These ingredients are introduced into a suitable mixer and homogenised. When the ingredients of the first layer are thoroughly mixed, a suitable binder is added, if required. Suitable binders include, but are not limited to, water, sodium silicates, sodium carbonate, organic and inorganic chemical binders and cements generally available in industry. Mixing of the first layer components is continued until granulation has occurred. The various times, energies, temperatures and the need for drying are specific for each type of mixer, and can be selected as necessary.

Following creation of the first layer, progressive layers of constituents are added to the first layer in a sequential process, either in one mixing device or several mixing devices in series. The creation of each layer requires the pre-weighing and mixing of the desired layer components. The various times, energies, temperatures and the need for drying are specific for each type of mixer, and can be selected as necessary.

In the later stages of preparing pellets according to the present invention, drying or preheating of the components of each layer may be used to consolidate and dry the pellets, or condition the pellets for eventual addition to a glass batch, respectively.

Mixing, blending, first layer pelletization and subsequent, further, layering can also be undertaken in a series of different mixing stages. This depends on the mixer being used and on a user's preference, i.e. this can depend on the type of glass to be manufactured by the pellets.

U.S. Pat. No. 4,418,153 describes a mixer which could be used to prepare a layered glass pellet according to one embodiment of the present invention.

In an exemplary process for forming a layered pellet, each of the layer mixtures are pre-blended, crushed and/or ground, as required, by a suitable method including, but not limited to, jaw crushing, roll milling and ball milling. In the example, non-limiting, pellet discussed below with reference to FIG. 1, a two layer pellet was prepared. The process described below with reference to one particular embodiment can be modified such that the desired components of each layer of a pellet are introduced sequentially.

The desired amount of the first layer was placed in an Eirich™ pan pelletiser. Exemplary Eirich™ pan pelletisers range from small R11 types to production types, e.g. DE 22 types; although, other types of pan pelletiser can be used. The Eirich™ pan pelletiser was operated at a pan rotation speed of 20 to 200 rpm and a mixer arm rotation speed of 0 to 500 rpm. Pan and material temperatures were controlled between 0 and 60° C. As the material tumbled around the pan, a fine mist spray of a binder dissolved in water at 5-50% solution was introduced, after adding 0.5 to 2% by dry weight of the selected binder, in this case sodium silicate solution (but other binders could be used), was introduced at a level so as to cause the material to aggregate into fine pellets. Pellet formation occurred within a few seconds but it can take up to 5 minutes for the pellets to reach a uniform size and shape (generally spherical).

Once the pellets were of a similar size, two possibilities were employed for introducing the next layer.

The first possibility was to discharge the pellets and further layer the pellets sequentially in a series of similar mixers, by the addition of correctly weighed, batched and proportional second layer. The materials for the second layer were introduced, along with further binder additions, to keep the surface of the growing pellets damp so that the freshly added material adhered preferentially to the existing pellets. Formation of the second layer takes from 5 seconds to 5 minutes, depending on the volume and size of the second layer components.

The second possibility is to introduce the materials for the second layer into the same pelletiser as the pellets made in the formation of the first layer.

In this second possibility, the second material was slowly introduced, along with further binder additions to keep the surface of the growing pellets damp so that the freshly added material adhered preferentially to the existing pellets.

Any further materials, for any desired additional layers, were then introduced in the same manner.

The pellets resulting from both options mentioned above had dimensions of around 8 mm. The pellets were then transferred to, and dried, in a fan assisted oven at 110° C. to constant mass in preparation for testing and evaluation, and subsequent use in a glass making process.

Similar stages of layer formation occur with each subsequent layer until the final pellets are formed with the desired number of layers, each layer having its own chemical makeup, for any set of pellets' particular purpose. The layers can be selected to give the pellets a particular makeup for its desired glass batch chemistry, and with a chemical release sequence desired for optimum operation of the melting process.

Figure 1:
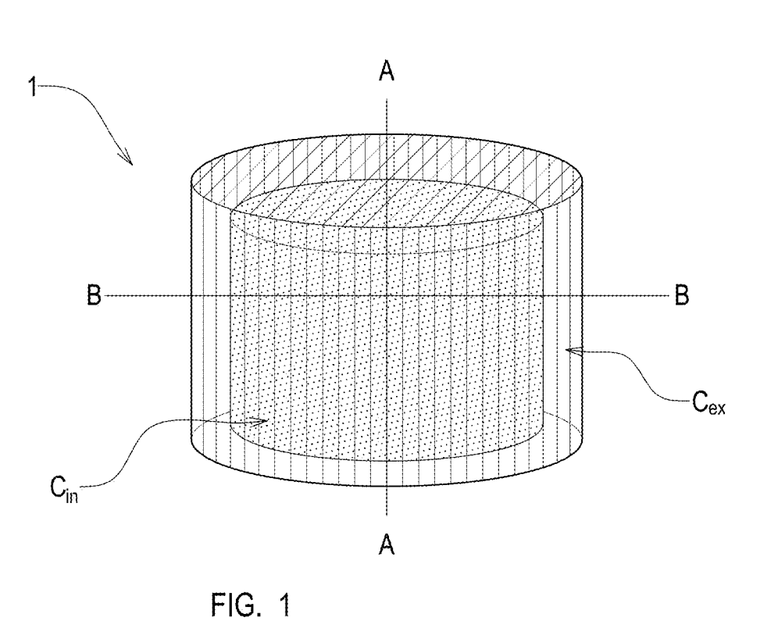
FIG. 1 shows a pellet according to one non-limiting embodiment of the present invention.

Example of a Layered Pellet:

Referring now to FIG. 1, a pellet, which can be manufactured as set out above, is shown.

The non-limiting example shown in FIG. 1 relates to a pellet 1 for use in a glass batch process which approximates as a cylindrical pellet. The approximately cylindrical pellet of FIG. 1 has an internal cylinder, $C_{in}$ (shown as a block of grey in FIG. 1), and an external cylinder, $C_{ex}$ (shown as cross-hatched in FIG. 1).

Figure 2A:
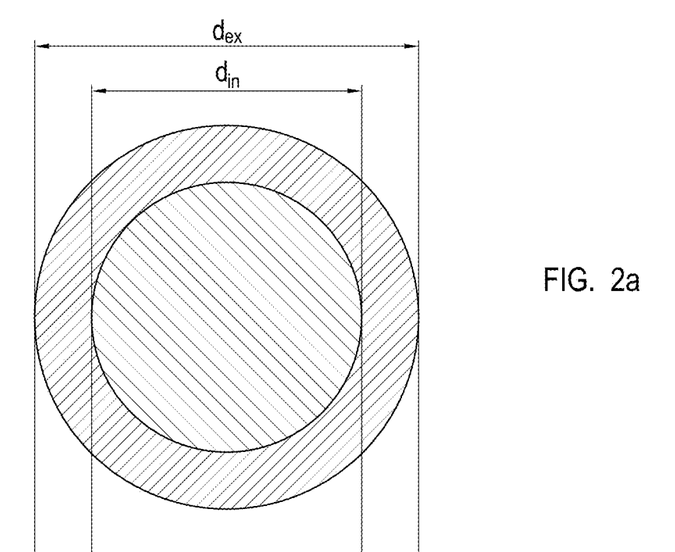
FIGS. 2A and 2B show two cross-sections of the pellet of FIG. 1.

FIG. 2A shows the non-limiting pellet of FIG. 1 in cross-section along the axis shown by the line A-A. FIG. 2A shows the internal cylinder to have a first diameter, $d_{in}$, and the external cylinder to have a second diameter, $d_{ex}$.

Figure 2B:
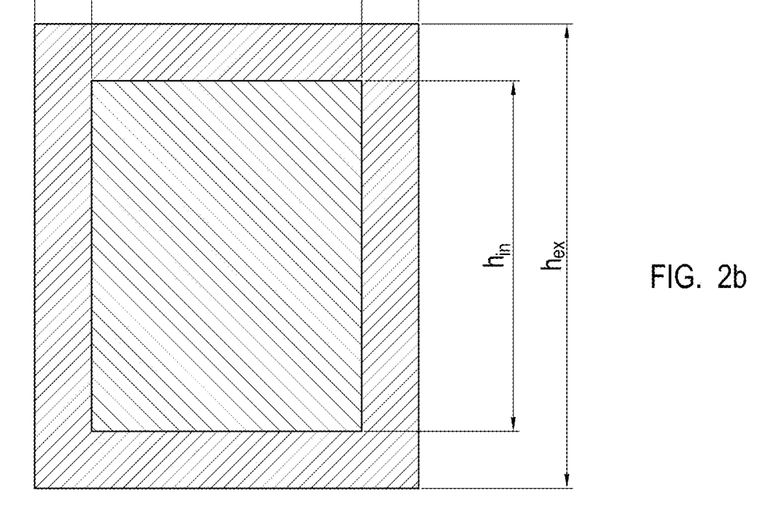

FIG. 2B shows the non-limiting pellet of FIG. 1 in cross-section along the axis shown by the line B-B. FIG. 2B shows the internal cylinder to have a first height, $h_{in}$, and the external cylinder to have a second height, $h_{ex}$.

For the purposes of experiment, i.e. to ensure that the pellets had the dimensions shown by FIGS. 1 and 2 and had the constituent parts as set out in the following description, pellets in these examples were produced using a press. The components of the internal cylinder were mixed and then pressed to form the internal cylinder. The components of the outer cylinder were then mixed, introduced around the previously formed internal cylinder (optionally in the presence of a binder) and then pressed to form the cylinder comprising the internal and external cylinder. This formation process is not shown in the figures. In other embodiments, the pellets can have alternative shapes, e.g. generally cylindrical, prismatic or any other three dimensional shape. Pellets according to the present invention can also be formed by pan pelletization, as set out above.

Considering the generally cylindrical pellet shown in FIG. 1, the volumes of the internal and external cylinders can be calculated as follows.

Volume of inner cylinder, $V_{in}$:

$$V_{in} = h_{in} \cdot \frac{\pi}{4} \cdot d_{in}^2$$

Use of a pressing tool during pressing with a fixed $d_{in}$ yields cylinders with a height of:

$$h_{in} = \frac{4 \cdot V_{in}}{\pi \cdot d_{in}^2}$$

Volume of external cylinder, $V_{ex}$:

$$V_{ex} = (h_{in} + \Delta h) \cdot \frac{\pi}{4} \cdot d_{ex}^2 - h_{in} \cdot \frac{\pi}{4} \cdot d_{in}^2$$

Using a pressing tool with a fixed $d_{ex}$ yields cylinders with height $h_{ex} = h_{in} + \Delta h$, thus:

$$h_{ex} = \frac{4 \cdot V_{ex}}{\pi \cdot d_{ex}^2} + h_{in} \cdot \frac{d_{in}^2}{d_{ex}^2}$$

and, $$\Delta h = \frac{4 \cdot V_{ex}}{\pi \cdot d_{ex}^2} - h_{in} \cdot \left(1 - \frac{d_{in}^2}{d_{ex}^2}\right)$$

In the example pellets prepared and tested in the non-limiting examples $d_{in}$=1.6 cm, $d_{ex}$=2.0 cm, ρ (density of materials) was approximated at 1.6 g cm$^{-3}$ and $m_{total}$ (total mass of each pellet) was 12 g. Therefore, we obtain, approximately, $h_{in}$=1.9 cm and $h_{ex}$=2.4 cm.

Two different strategies were employed to test which compositions of the internal and external cylinders resulted in the most preferable melt characteristics. Each strategy resulted in different melting paths according to the phase diagrams shown in FIG. 5 (showing strategy 1) and FIG. 6 (showing strategy 2).

Strategies 1 and 2 both aim at the same objective, i.e. to resorb as much calcia as possible at an early stage of melting. In strategy 1, the primary melt is a salt-like flux with a low viscosity and a high affinity to the undissolved sand; this is reached at the expense of a relatively high temperature of onset of melting. In strategy 2, the primary melt is less salt-like and has a somewhat lower affinity to the undissolved sand, but a significantly lower temperature of onset of melting. Both strategies are non-limiting examples among which an even better balance of the features "salt-like nature, hence, high affinity to the undissolved sand" and "low onset temperature of melting" may be found.

Figure 5:
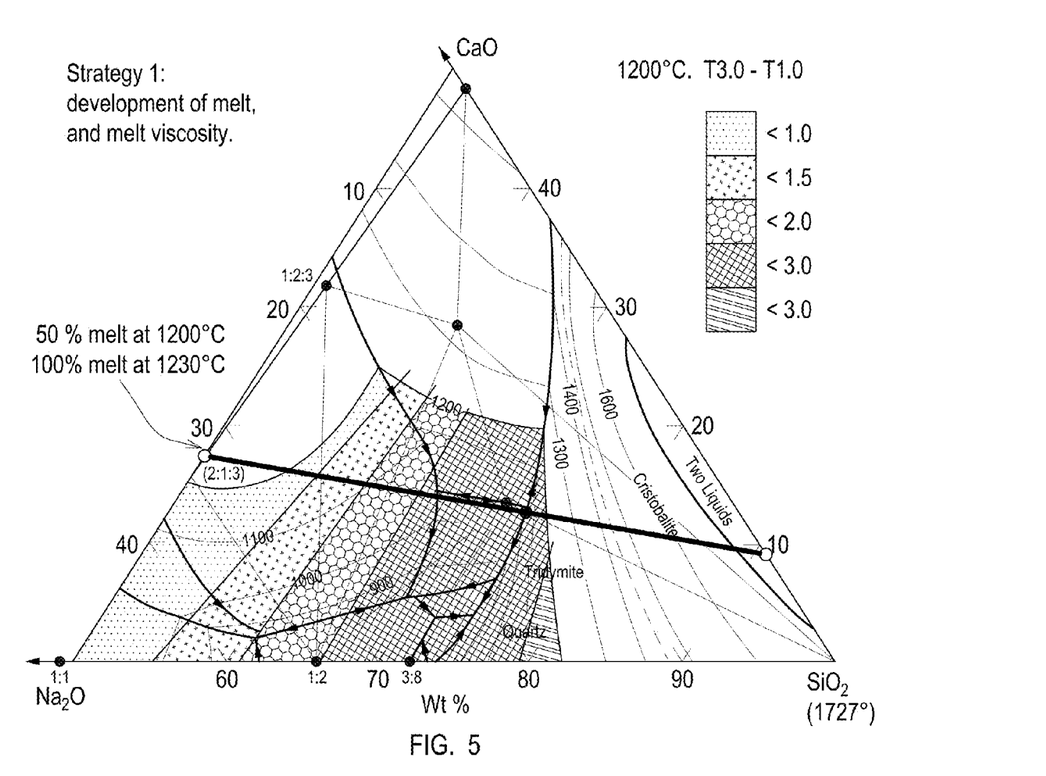
FIG. 5 is a phase diagram of a strategy 1 pellet, according to one embodiment of the present invention.
Figure 6:
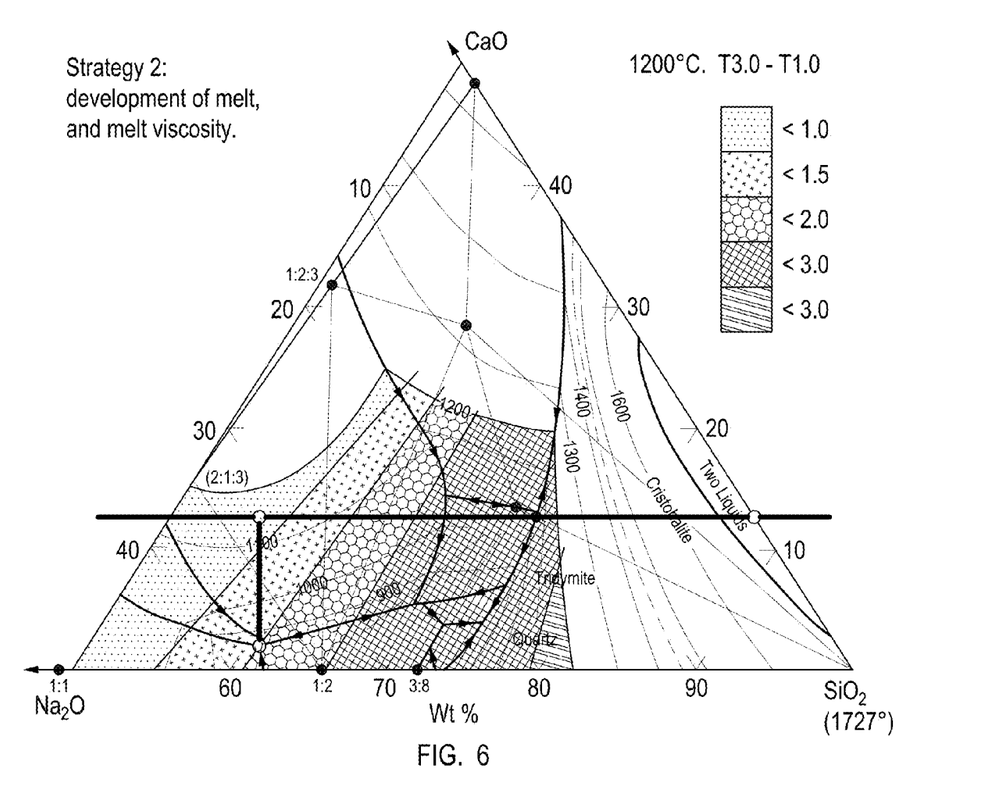
FIG. 6 is a phase diagram of a strategy 2 pellet, according to one embodiment of the present invention.

The boundaries are non-limiting in so far as FIGS. 5 and 6 refer to simple model batches containing soda ash, limestone and sand only. In other exemplary glass batches, the corresponding system would comprise the following three essential components:

Model sand component(s): sand, $Al_2O_3$ carriers like feldspars, iron red, and/or any oxidic raw materials with high melting points.

Model limestone component(s): limestone and/or dolomite.

Model soda ash component(s): soda ash, any fining agents, coal, any color agents and/or decolorizers.

This does not limit the decision to arbitrarily change the allotment of minor batch constituents (fining agents, coal, color agents, decolorizers, etc.) to any of the above categories.

As a consequence, the composition of the PRE-MIX depends on the specific glass composition and the specific raw material base used. But the general strategy is always identical: The PRE-MIX is designed to generate a salt-like low-viscosity flux containing high amounts of calcia and magnesia, possessing a high affinity to sand, and the lowest onset temperature of melting attainable under these conditions. The POST-MIX contains the residual amounts summarized under the categories model sand and model limestone (see above).

Pellets composed of two cylinders, one cylinder inside the other, were prepared according to the above considerations. Each cylinder had a different composition according to either strategy 1 or strategy 2 below. Strategies 1 and 2 below set out the components of the cylinders within each cylinder, in these examples. The strategies are shown in tables 1 and 2 below:

TABLE 1

STRATEGY 1

|  | g/mol | kg/t | kmol/t | g sample |  | wt % |
|---|---|---|---|---|---|---|
| BATCH |  |  |  |  |  |  |
| sand | 60.084 | 720.0 | 11.9832 |  |  |  |
| limestone | 100.089 | 249.9 | 2.4965 |  |  |  |
| soda ash | 105.989 | 239.4 | 2.2587 |  |  |  |
| sum |  | 1209.3 | 16.7384 |  |  |  |
| PRE MIX |  |  |  |  |  |  |
| SiO2 | 3.7247 | 223.8 |  | 2.24 | SiO2 | 50.00 |
| CaCO3 | 1.4660 | 146.7 |  | 1.47 | CaO | 14.44 |
| Na2CO3 | 2.2587 | 239.4 |  | 2.39 | Na2O | 35.58 |
| CO2 |  | 163.9 |  |  |  |  |
| sum |  |  |  | 6.10 |  |  |
| POST MIX |  |  |  |  |  |  |
| SiO2 | 8.2585 | 496.2 |  | 4.96 | SiO2 | 89.57 |
| CaCO3 | 1.0305 | 103.1 |  | 1.03 | CaO | 10.43 |
| CO2 |  | 45.4 |  |  |  |  |
| sum |  |  |  | 5.99 |  |  |

Strategy 1, in table 1, shows a non-limiting example mixture of sand, limestone and soda ash which can be combined in a batch to prepare a glass by a batch melt process. Table 1 shows the constituents of two layers in a layered pellet; the pre mix is in a first layer and the post mix is in a second layer. Tests were carried out having the post mix layer as the external cylinder and the pre mix layer as the inner cylinder, and vice versa.

Generally speaking, strategy 1 utilises a salt-like primary melt from the metasilicate join. Using compositions according to strategy 1, the melt starts with a low-liquidus low-viscosity salt-like melt. Sand is added in proportions so that the system stays at the metasilicate join. The primary melt disappears rapidly, leaving behind solid silicates. Secondary melt does not start before 1120° C., then moves rapidly towards the final composition. In other words, strategy 1 utilises a generally low viscosity and melt starts later than strategy 2 (see below) because it is a more mobile composition in the melt.

TABLE 2

STRATEGY 2

|  | g/mol | kg/t | kmol/t | g sample |  | wt % |
|---|---|---|---|---|---|---|
| BATCH |  |  |  |  |  |  |
| sand | 60.084 | 720.0 | 11.9832 |  |  |  |
| limestone | 100.089 | 249.9 | 2.4965 |  |  |  |
| soda ash | 105.989 | 239.4 | 2.2587 |  |  |  |
| sum |  | 1209.3 | 16.7384 |  |  |  |
| PRE MIX |  |  |  |  |  |  |
| SiO2 | 3.8871 | 233.6 |  | 2.34 | SiO2 | 53.77 |
| CaCO3 | 1.0844 | 108.5 |  | 1.09 | CaO | 14.00 |
| Na2CO3 | 2.2587 | 239.4 |  | 2.39 | Na2O | 32.23 |
| CO2 |  | 147.1 |  |  |  |  |
| sum |  |  |  | 5.82 |  |  |

TABLE 2-continued

STRATEGY 2

|  | g/mol | kg/t | kmol/t | g sample |  | wt % |
|---|---|---|---|---|---|---|
| POST MIX |  |  |  |  |  |  |
| SiO2 | 8.0961 | 486.4 |  | 4.86 | SiO2 | 89.57 |
| CaCO3 | 1.4121 | 141.3 |  | 1.41 | CaO | 10.43 |
| CO2 |  | 62.1 |  |  |  |  |
| sum |  |  |  | 6.27 |  |  |

Strategy 2, in table 2, shows a non-limiting example mixture of sand, limestone and soda ash which can be combined in a batch to prepare a glass by a batch melt process. Table 2 shows the constituents of two layers in a layered pellet; the post mix is in a first layer and the post mix is in the second layer. Tests were carried out having the post mix layer as the external cylinder (layer) and the pre mix layer as the inner cylinder (layer), and vice versa.

Generally speaking, strategy 2 utilises a low temperature eutectic mixture. Using strategy 2, there is a low-liquidus and high viscosity silicate melt at the start of melting. Limestone is added in an amount that the major part of CaO is resorbed in the melt. Solid ternary silicates precipitate, leaving 22 wt. % melt behind. Secondary melting proceeds steadily towards the final composition. In other words, strategy 2 utilises a generally high viscosity and melt starts earlier than strategy 2 (see below) because it is a more aggressive composition in the melt.

In the following discussion, the strategies are compared and referred to as shown in table 3:

TABLE 3

| melting path | inner mixture | outer mixture |
|---|---|---|
| PRE-S1 | Strategy 1 | PRE | POST |
| POST-S1 | Strategy 1 | POST | PRE |
| PRE-S2 | Strategy 2 | PRE | POST |
| POST-S2 | Strategy 2 | POST | PRE |
| Strategy 0 | normal batch mixture; treated as reference pellet batch | | |

Following the above nomenclature, a pellet formed according to strategy 1, with pre mix layer as the internal cylinder and the post mix layer as the external cylinder is designated PRE-S1.

Figure 3A:
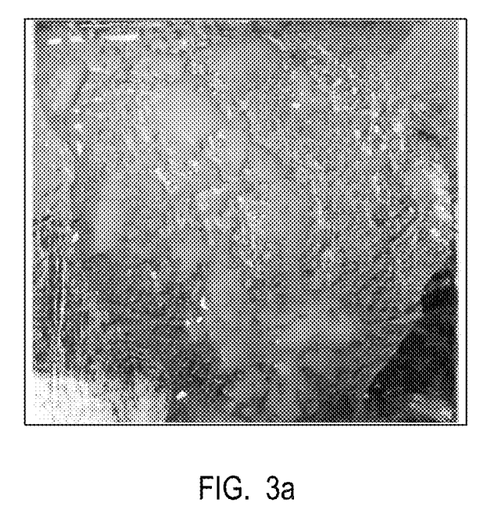
FIGS. 3A and 3B are pictures showing the product of the melt of two pellets.
Figure 3B:
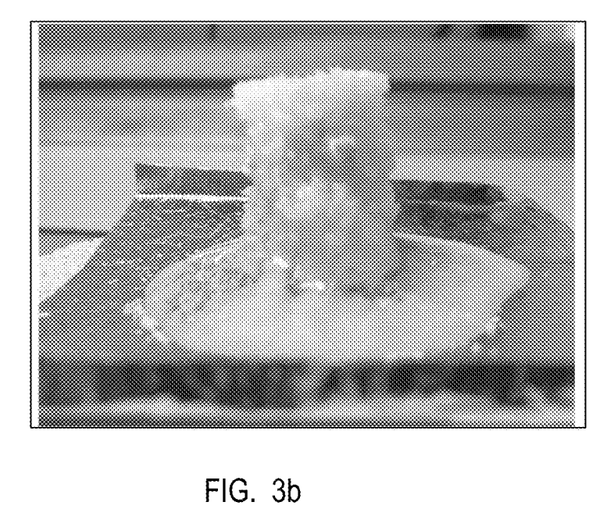

FIGS. 3A and 3B are pictures showing the melt products of pellets formed using strategy 1. FIG. 3A shows the use of premix as the internal cylinder. FIG. 3B shows the use of postmix as the internal cylinder. The pellets were fired up to 1300° C. in a furnace at a rate of 10° C. per minute; once 1300° C. was reached, the furnace was left for one hour; the product was allowed to cool and a picture taken.

Figure 4A:
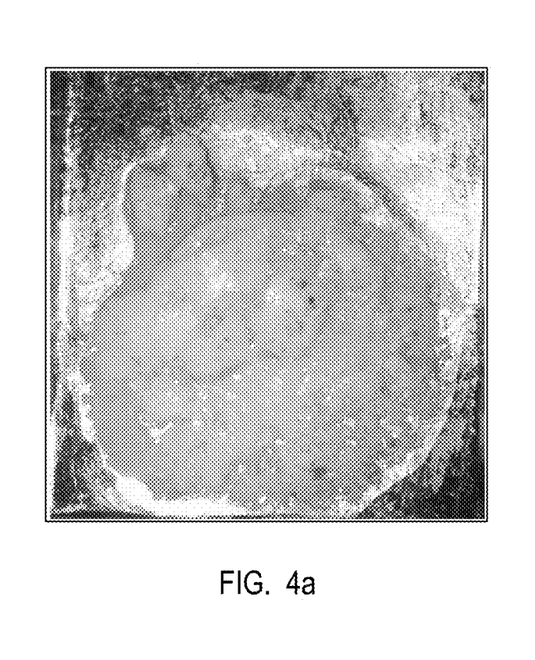
FIGS. 4A and 4B are pictures showing the product of the melt of two further pellets.
Figure 4B:
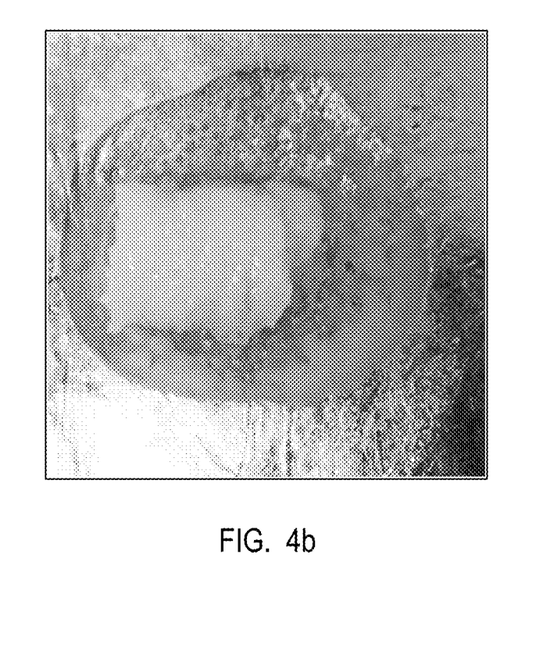

FIGS. 4A and 4B are pictures showing the melt products of pellets formed using strategy 2. FIG. 4A shows the use of premix as the internal cylinder. FIG. 4B shows the use of postmix as the internal cylinder. The pellets were fired up to 1300° C. in a furnace at a rate of 10° C. per minute; once 1300° C. was reached, the furnace was left for one hour; the product was allowed to cool and a picture taken.

It can be seen from FIGS. 3A, 3B, 4A and 4B that placing the so called premix as the internal cylinder results in a glass product which is generally uniform. In contrast, placing the postmix as the internal cylinder results in a stump, i.e. a generally solid mass, surrounded by melted products from the external cylinder (premix). It is preferable to place the premix on the inside of the pellet, surrounded by the postmix.

The premix of both strategy 1 and strategy 2 contains $SiO_2$, $CaCO_3$ and $Na_2CO_3$. The postmix of both strategy 1 and strategy 2 contains $SiO_2$ and $CaCO_3$, but no $Na_2CO_3$. Without wishing to be bound by theory, it is thought that the postmix having no $Na_2CO_3$ is less reactive and less fluxy than the premix, which necessarily includes $Na_2CO_3$. Having the less reactive postmix layer on the outside of the exemplary pellets means that at high temperature in the melt the premix reacts but is bound by the postmix which acts to contain a portion of the $CO_2$ evolved by reactions in the premix. This increased pressure, relative to a pellet which is uniform in composition, increases the rate of reaction and the pellets react from the inside out, as well as from the outside in by the reaction of melt components with the external surface of the exemplary pellets. It has been found that placing more that 19% of the total $Na_2CO_3$ by weight of the whole pellet in the postmix (in the external layer) results in the formation of a stump after firing. Placing any one of 19% or less, for example 18%, 17%, 16%, 15%, 14%, 13%, 12%, 11%, 10%, 9%, 8%, 7%, 6%, 5%, 4%, 3%, 2%, 1% or 0% by weight of the whole pellet in the postmix (in the external layer) results in no formation of a stump after firing. The less $Na_2CO_3$ by weight there is present in the postmix (in the external layer) the better the melt characteristics of the pellet.

In these examples, the binder for the different layers is a solution of water and sodium silicate. In other embodiments, the binder for the different layers can be a solution of alkali metal carbonate in water, or another suitable binder.

In these examples, the pellets have been approximated as cylinders. This example has been selected to show the calculations required to measure the volumes and amounts of the different constituents of the example pellets. The pellets may be made to be other shapes and sizes, e.g. the pellets may approximate as an ovoid, a cylinder, a prism, a cuboid, a cube, a pyramid, a cone or any other three dimensional shape.

The layers of the pellets may be equivalent three dimensional shapes to the first layer, or may be different shapes. An important calculation above is the amount of each substance to arrive at layers having preferred compositions so that the reaction pathway in a glass melt can be controlled, as required.

By having different layers made up of different substituents and using the pellets from the non-limiting examples above as one of the starting materials of the glass melt, the reaction pathways in a glass melt can be controlled so that they follow a preferable route. Providing a faster rate of melt in a glass melt furnace results in the use of less energy to heat the furnace per unit of glass produced.

In the non-limiting example of FIG. 1, the layers are continuous in the sense that the internal layer does not contact the outside atmosphere, i.e. the external layer encloses the internal layer. In other embodiments, the layers are not continuous. For example, one layer can cover another layer or the first layer, but within that layer there may be the constituents of another layer in separated particulate form.

The melt products, i.e. the generally solidified glass produced after heating certain pellets, were analysed by X-ray diffraction. X-ray diffraction was used in this instance to give a qualitative indication of the amount of crystobalite present in the resultant melt product. The amount of crystobalite present is a direct measure of the amount of residual (i.e. yet undissolved) sand. In industrial glass melting processes, the time demand for complete sand dissolution essentially determines the overall dwell time in a furnace required to obtain a clear and workable melt. It thus determines the productivity of melting as well as the efficiency of heat exploitation. As can be seen from FIG. 8, there is less resultant crystobalite in the sequence: strategy 2<strategy 1<strategy 0. This indicates that strategies 1 and 2 provide much better melt characteristics (result in less undissolved sand) than strategy 0. In the particular example, strategy 2 results in slightly better melt characteristics than strategy 1.

Some magnesium oxide (MgO) and/or aluminium oxide ($Al_2O_3$) may be added to one or more layers of the pellet, to ultimately provide glass having a particularly desired chemical make up. In one embodiment, MgO is added as dolomite in place of some of the $CaCO_3$, in any one of the layers. In one embodiment, one or more alumina bearers may be added to any one of the layers. Alumina bearers include feldspars and/or kaolin. In a particular embodiment, one or more alumina bearers are preferably added to the outer layer of the pellets.

Method for Making Glass

Figure 7:
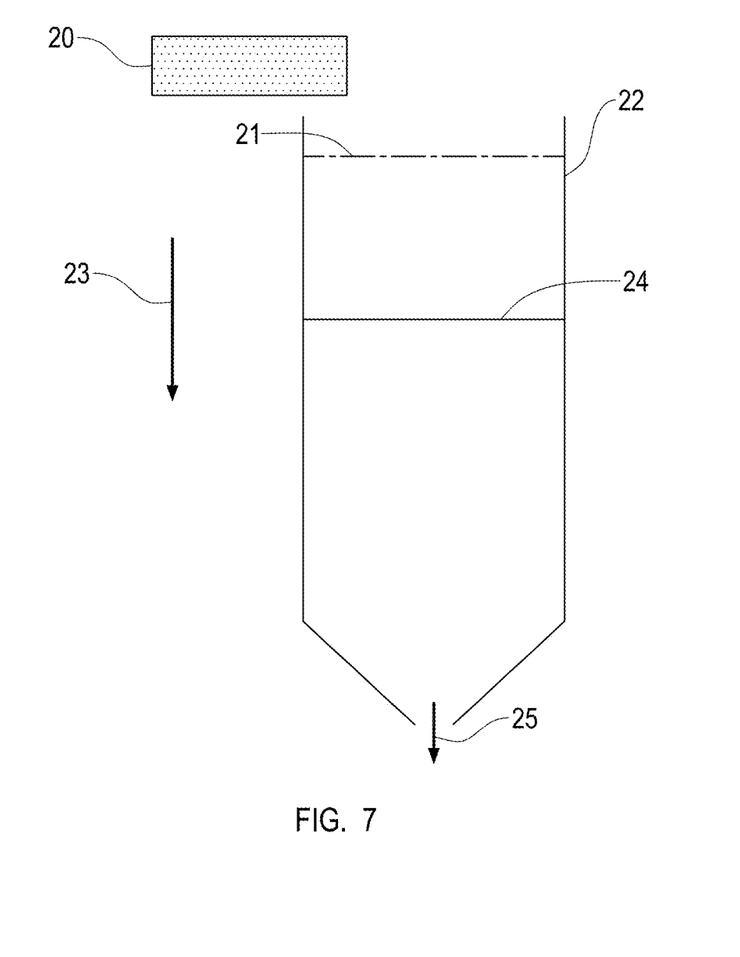
FIG. 7 is a schematic representation of a glass batch furnace.

Referring to FIG. 7, a glass melt furnace 22 is schematically represented. A number of pellets 20 have been made using the methods described above. Pellets 20 are introduced into the glass melt furnace 22. The pellets 20 can be of the type illustrated by FIG. 1, and discussed above.

The glass melt furnace 22 is heated by heaters (not shown). The glass melt furnace 22 can be heated to a constant temperature along its length. The glass melt furnace 22 can also have an incremental increase in temperature along the whole or a part of its length. The arrow 23 generally shows an increase in temperature from the top of the furnace to the bottom of the furnace. At the bottom of the furnace, arrow 25 shows the passage of molten glass once it has melted and reacted in the glass furnace 22. The molten glass taken out of the furnace can be processed as is standard for molten glass, e.g. to make glass panes and other glass wares.

There are two boundary lines shown by dashed lines 21 and 24 in FIG. 7. These two boundary lines generally show different interfaces between reactants in the glass furnace 22. When the pellets 20 are added into the glass furnace, they are solid pellets. The different layers of the pellets melt sequentially, and at different temperatures, going down the glass furnace 22 towards the exit (indicated by arrow 25). At the interfaces, indicated by dashed lines 21 and 24, the different layers of the pellet react with the already molten glass melt. In other words, after line 24, all of the contents of the pellet are melted and are reacting.

At the interface 24, for example, the molten glass reacts with different layers of the pellets.

FIG. 2 is schematic in the sense that there may be more or less of the interfaces generally indicated by lines 21 and 24, depending on the number of layers of the pellet, the temperatures chosen along the length of the furnace and the specific chemistries of each layer of the pellets.

Figure 9:
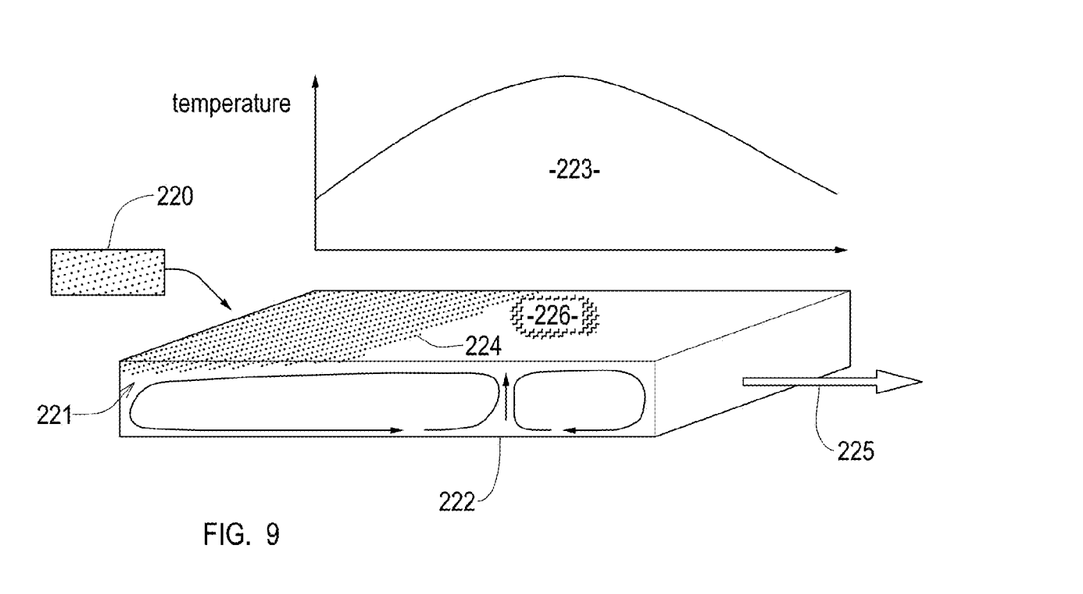
FIG. 9 is a schematic representation of an alternative glass batch furnace.

In another embodiment, the glass pellets 220 are introduced into a shallow tank (FIG. 9). In this embodiment, the main flow proceeds in horizontal direction, generally indicated by the arrow at 225 in FIG. 9. The batch 221 floats on top of the melt. A vortex of flow of hot glass flows below the batch and conveys extra heat to the batch. Thus, the batch is melted from both above and below. Within a first vortex (to the left in FIG. 9), the residual sand is dissolved. The fining process (driving out bubbles from the melt) takes place in the space dominated by a second vortex (to the left in FIG.

9). Refining (resorption of residual bubbles, conditioning) takes place in a space following arrow 225. This compartment can be termed a "refiner". Depending on the furnace design, the melter 222 may be separated from the refiner by a narrow hole (a "throat"; typical for container glass) or a slightly narrow passage (a "waist", typical for float glass). 223 in FIG. 9 shows a typical temperature distribution along the longitudinal axis of the furnace. The highest temperatures are met at the so-called hot spot 226, which, at the same time, is a spring point with a strong upward flow of glass melt.

The pellets of the present invention can be used to make glass. One exemplary process for making glass requires the addition of pellets into the top of a furnace which already contains a glass solution, as shown schematically by FIG. 7 and as discussed above. Another exemplary process for making glass is set out with reference to FIG. 9, above.

When referring to a glass solution, it is common to refer to the thermodynamics of the glass solution with reference to the temperature at which different steps and/or features of the glass melt occur. For example, it is common to refer to the temperature at which a particular viscosity of the glass solution is reached.

In the exemplary pellet, as shown in FIG. 1 and described above, the outer layer $C_{ex}$ is generally less reactive than the inner layer $C_{in}$ because $C_{ex}$ contains little or no $Na_2CO_3$.

The inner layer $C_{in}$ is more aggressive and fluxy than the outer layer $C_{ex}$. Indeed, as the outer layer $C_{ex}$ is less reactive than the inner layer, $C_{ex}$ generally acts to contain the melt products and slow down the gas release of the inner layer $C_{in}$ to increase the rate at which the inner layer $C_{in}$ melts and reacts from the inside out until a temperature is reached at which all of the pellet melts and enters the liquidus state.

The relative efficiency of each stage of the dissolution of each of the layers can be improved by introducing agents which release bubble forming agents within the first layer, e.g. sodium sulphate.

Figure 8:
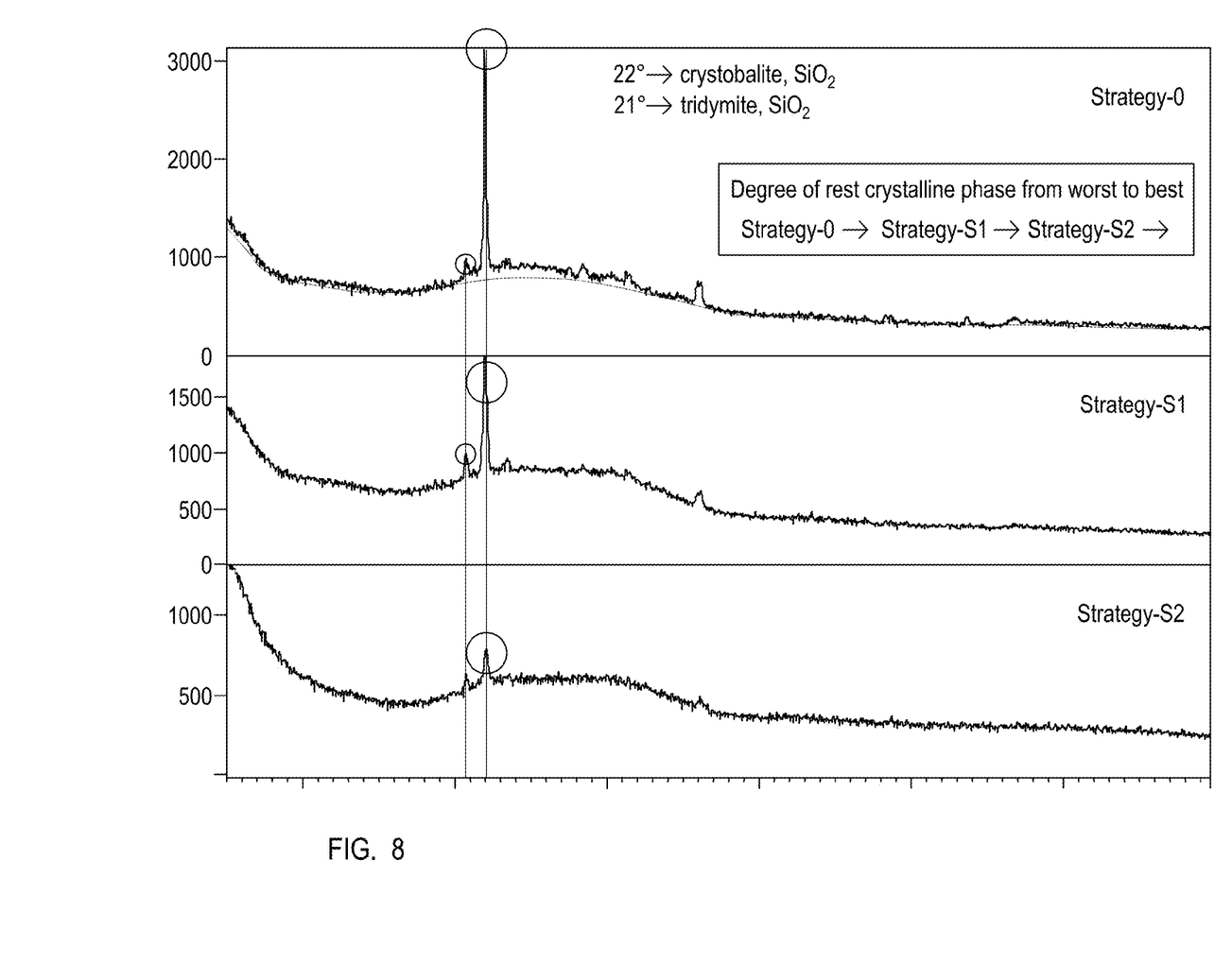
FIG. 8 shows X-ray diffraction patterns for the product of the melt of three different pellets.

Based on the X-ray diffraction patterns of FIG. 8, i.e. based on the peak heights, the quartz dissolution is about 25% faster for strategy 2 and about 50% for strategy 1, relative to strategy 0. Images taken of the glass melts formed using the pellets of the present invention suggest the same ratios.

In a glass melt process, assuming a total dwell time of 24 h (12 h for the quartz dissolution and 12 h for fining). Given that the fining process requires identical times in either case, the overall dwell time in the furnace could be reduced to 20 h for strategy 1 pellets and to 15 h for strategy 2 pellets (these strategies having been explained above). So, an increase of efficiency of at least 15% is expected in a glass melt process using pellets of the present invention, when compared to typical, well known, pellets. This increase in efficiency will be reflected by a similar percentage reduction in energy consumption. This estimate in the increase of efficiency is probably too timid. This is especially so with pellets under strategy 2, where there is potential for greater energy savings. Pellets of the preset invention are expected to result in at least a 15 to 20% saving in energy consumption when used in glass melt processes, when compared to known pellets.

Pelletization of glass batches is a common concept. According to the present invention, the composition of the batch pellets, in total, keeps the chemistry within expected limits for the type of glass to be manufactured. However, the pellets are prepared by way of a layering process. The layering process allows glass to be made with lower kinetic constrains in the melting stage which allows for lower energy consumption, overall, and increased efficiency.

Figure 10:
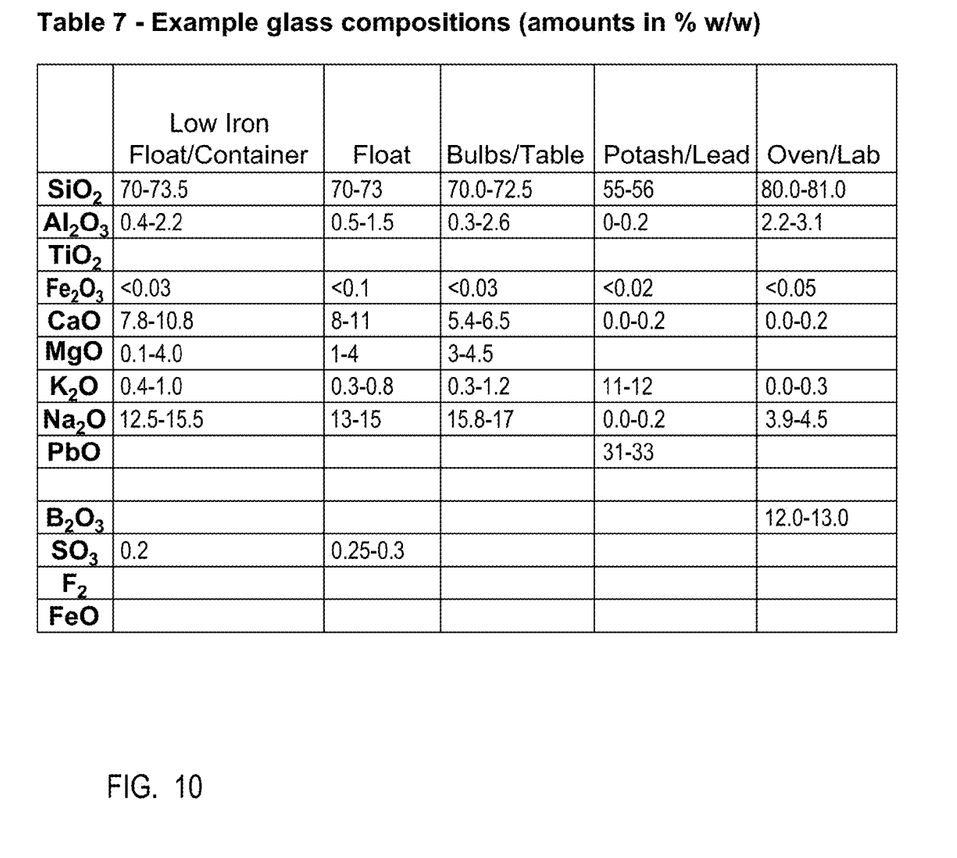
FIG. 10 is a table showing example glass compositions.
Figure 11:
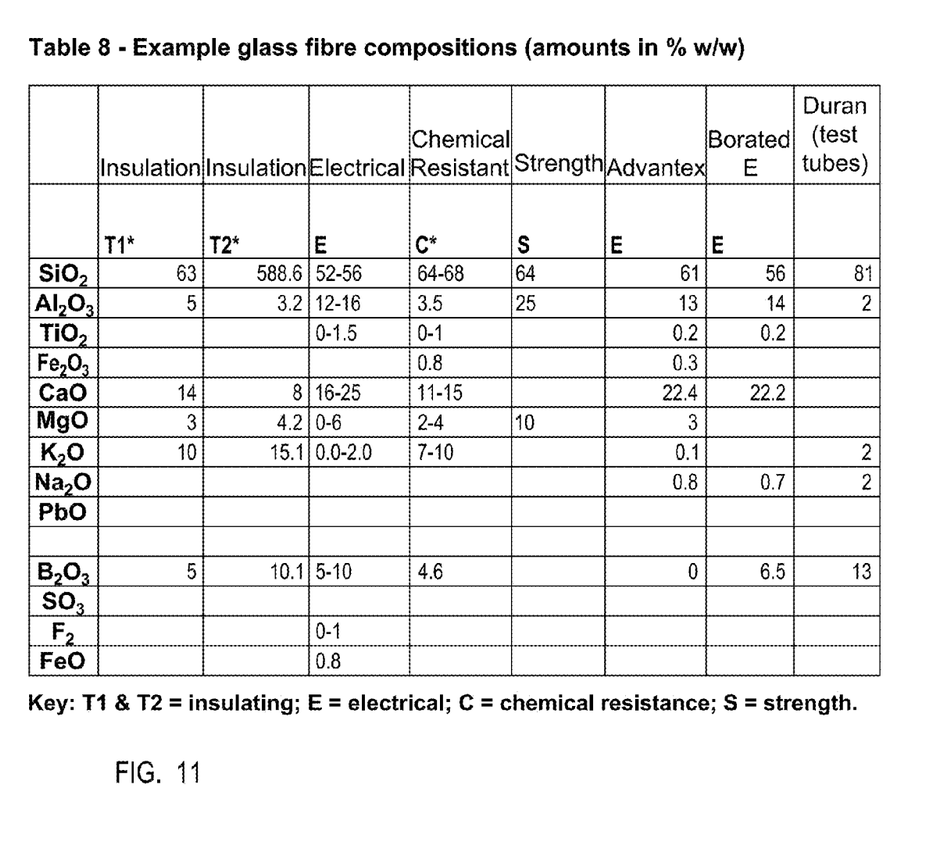
FIG. 11 is a table showing example glass fibre compositions.

The overall compositions of certain, non-limiting, glasses made using the pellets of the present invention are shown in tables 7 and 8 (FIGS. 10 and 11, respectively). The ingredients of the overall compositions are prepared as pellets according to the present invention.

In another aspect of the present invention, decolourisers (e.g. selenium, barium selenite and erbium oxide) can be included in the first layer, for example $C_{in}$ of the pellet described with reference to FIG. 1. Fining agents, colour agents and decolourisers tend to be volatile and flare off during the glass melt processes. By including decolourisers in the first layer, their tendency to flare off is reduced. In other words, by including decolourisers in the first layer of pellets, less decolouriser is required because less is wasted by volatilisation. This saves on cost and improves efficiency, i.e. by wasting less material.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of making a pellet for use in a glass batch process the pellet comprising a first layer comprising $Na_2CO_3$ and a second layer comprising $SiO_2$ and $CaCO_3$ enclosing the first layer, the first layer comprising 90% or more $Na_2CO_3$ by weight of the whole $Na_2CO_3$ content of the pellet, the method comprising the steps of:
   pelletising the components of the first layer comprising 90% or more $Na_2CO_3$ by weight of the whole $Na_2CO_3$ content of the pellet, wherein the first layer comprises trace ingredients of glass; and
   pelletising the components of the second layer comprising $SiO_2$ and $CaCO_3$, and the pelletised first layer, so that the components of the second layer form a layer over the first layer.

2. The method of claim 1, wherein the first layer comprises 99.1% or more $Na_2CO_3$ by weight of the whole $Na_2CO_3$ content of the pellet.

3. The method of claim 1, further comprising the step of:
   pelletising a third layer, wherein the third layer (i) is enclosed by the first layer; (ii) is between the first layer and the second layer; or (iii) encloses the second layer.

4. The method of claim 3, further comprising the step of:
   pelletising a fourth and optionally additional layer or layers.

5. The method of claim 1, further comprising the step of including one or more decolourisers in the first layer, wherein the decolourisers comprise selenium, barium selenite, erbium oxide, or a combination thereof.

6. The method of claim 1, wherein the step of pelletising the components of the first layer includes pelletising a mixture comprising $SiO_2$, $CaCO_3$ and $Na_2CO_3$.

7. The method of claim 1, wherein the step of pelletising the components of the second layer includes pelletising a mixture comprising $SiO_2$ and $CaCO_3$.

8. The method of claim 1, further comprising the step of binding the first layer, the second layer, and any additional layers together with a binder.

9. The method of claim 8, wherein the binder is selected from the group consisting of water, clay, cement, an aqueous solution of sodium silicate, and an aqueous solution of sodium carbonate.

\* \* \* \* \*

UNITED STATES PATENT AND TRADEMARK OFFICE
CERTIFICATE OF CORRECTION

| | |
|---|---|
| PATENT NO. | : 9,598,306 B2 |
| APPLICATION NO. | : 14/956000 |
| DATED | : March 21, 2017 |
| INVENTOR(S) | : Samuel Mark Leese et al. |

It is certified that error appears in the above-identified patent and that said Letters Patent is hereby corrected as shown below:

In the Claims

In Column 14, Line 35, in Claim 1, delete "process" and insert -- process, --

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*